United States Patent [19]
Cakmaz et al.

[11] Patent Number: 5,785,144
[45] Date of Patent: *Jul. 28, 1998

[54] POWER STEERING SYSTEM/SERVO CONTROL

[75] Inventors: Aydoğan Cakmaz, Stuttgart; Arno Roehringer, Ditzingen, both of Germany

[73] Assignee: Mercedes-Benz AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 446,566

[22] Filed: May 19, 1995

[30] Foreign Application Priority Data

May 24, 1994 [DE] Germany ............... 44 18 118.3

[51] Int. Cl.⁶ ............... B62D 5/06; B62D 6/00; F04B 49/06
[52] U.S. Cl. ............... 180/422; 180/446
[58] Field of Search ............... 180/417, 421, 180/422, 442, 443, 446, 423

[56] References Cited

U.S. PATENT DOCUMENTS

| | | | |
|---|---|---|---|
| 5,125,158 | 6/1992 | Pedersen | 180/132 |
| 5,165,496 | 11/1992 | Pedersen et al. | 180/132 |
| 5,257,670 | 11/1993 | Miller et al. | 180/133 |
| 5,367,235 | 11/1994 | Fukudome | 318/286 |
| 5,474,145 | 12/1995 | Haga et al. | 180/132 |
| 5,582,264 | 12/1996 | Lang | 180/423 |

FOREIGN PATENT DOCUMENTS

| | | |
|---|---|---|
| 0 053 297 A1 | 10/1981 | European Pat. Off. . |
| 0 053 297 | 6/1982 | European Pat. Off. . |
| 36 22 217 A1 | 1/1988 | Germany . |
| 39 19 703 C2 | 4/1990 | Germany . |
| 39 20 862 | 1/1991 | Germany . |
| 42 08 004 A1 | 9/1993 | Germany . |
| 43 35 390 | 4/1995 | Germany . |
| 56-99859 | 8/1981 | Japan . |
| 61-119473 | 6/1986 | Japan . |
| 04-95574 | 3/1992 | Japan . |
| 06-37066 | 5/1994 | Japan . |
| WO 95/11152 | 10/1994 | WIPO . |
| WO 95/11152 | 4/1995 | WIPO . |

*Primary Examiner*—Brian L. Johnson
*Assistant Examiner*—Bridget Avery
*Attorney, Agent, or Firm*—Evenson, McKeown, Edwards & Lenahan, P.L.L.C.

[57] ABSTRACT

A servo control has an electromechanical or electrohydraulic support of setting strokes of a handle. A constantly running electric motor is coupled to a control member of the servo control by power flux which can be controlled by the handle. By way of an electronic load recognition, the load which is variable in dependence on the power flux and against which the electric motor has to operate is utilized to control the output of the electric motor. That is, the electric motor is switched to greatly increased output in the case of increased load.

11 Claims, 2 Drawing Sheets

POWER STEERING SYSTEM/SERVO CONTROL

BACKGROUND AND SUMMARY OF THE INVENTION

The present invention relates to a servo control, in particular a motor vehicle power steering system, having an electromechanical or electrohydraulic support of steering device setting strokes, and a constantly running electric motor coupled to a control member of the servo control or power steering system by power flux which can be controlled by the steering device.

Currently, hydraulic power steering systems, which have a hydraulic pump driven by the vehicle engine at different speeds depending on the operating state, are typically provided in motor vehicles. A servo valve is arranged on the discharge side of the pump and open in a central position. In principle, the servo valve has two parallel throttle paths leading to a hydraulic reservoir, each path having two controllable throttles arranged in series one after the other. These throttles are controlled in dependence on the actuating force to be applied at the steering wheel. That is, the throttle resistance of the input throttle of a throttle path is increased and the throttle resistance of the output throttle of this throttle path is reduced, whereas the throttles of the other throttle path are controlled in each case in the opposite direction. In this way, a hydraulic servomotor, usually a dual-action piston-cylinder assembly whose one motor connection is arranged between the throttles of the one throttle path and whose other motor connection is arranged between the throttles of the other throttle path, can be pressurized by a controllable pressure difference such that the servomotor generates a controllable assisting or servo power. As long as the actuating forces to be applied at the handle are negligibly small, the servo valve assumes its central position, in which both motor connections have the same, relatively low pressure, such that no assisting or servo power can be generated.

DE 36 22 217 A1 describes driving of the pump of such a servo control by an electric motor which is independent of the vehicle engine and whose output is controlled by a pressure sensor which registers the hydraulic pressure on the discharge side of the servo pump. The pump output and the output of the electric motor driving the pump can thus be adapted to the respective requirement.

DE 42 08 004 A1 likewise describes an electrohydraulic servo control. Here, provision is made for the pump driven by the electric motor to be provided with a purely mechanical valve device which is integrated in the pump and is still intended to allow sufficiently smooth manual steering of the vehicle even when the pump is stationary and thus even when the electric motor is stationary.

Furthermore, provision has already been made in a hydraulic power steering system to charge a hydraulic accumulator by a pump driven by an electric motor. A servo valve is connected downstream of the accumulator. The servo valve is closed in the central position and actuates a servomotor, which is connected to a relatively pressureless hydraulic reservoir in the central position of the servo valve via its two connections, in dependence on the actuating force to be applied at the handle. One motor connection is connected to the accumulator when disconnected from the hydraulic reservoir.

This known concept provides the advantage that the pump, and thus also the electric motor driving the pump, only have to work temporarily in order to recharge the hydraulic accumulator. This concept is, however, also comparatively expensive, because the pressure in the accumulator has to be monitored constantly. Moreover, the control characteristics of the servo valve can cause problems.

DE 36 19 703 C2 describes the use of an electric motor directly to generate an assisting or servo power. For a vehicle battery having been discharged to a relatively high degree and only having a small remaining residual capacity, the electrical current consumption of the electric motor is limited in dependence on the residual battery voltage. Thereby, the possible, generatable servo power will indeed accordingly be limited. In this way, however, it can be ensured to a very great extent that the headlamps of a vehicle are still lit with sufficient brightness despite a partially discharged battery.

An object of the present invention is now essentially to improve the normal operating characteristics of a servo control or power steering system with little additional expenditure.

According to the present invention, this object has been achieved in that a motor control with electronic load recognition is assigned to the electric current circuit of the electric motor and either (1) keeps the electric motor at a very low output or brings it to a very low output when the electric motor is operating against a low load, or (2) brings the electric motor to a high output or keeps it at a high output when the electric motor is operating against an increased load.

The present invention is based on the general recognition that, for control of the electric motor, the electric motor inevitably has to operate against different loads when the power flux between the motor and the control member changes. With a constantly running electric motor, the load state can be monitored constantly by a purely electrically operating motor control in order to control the motor in an optimum manner. As long as no assisting or servo power is required, the motor can then operate at an extremely low output and a correspondingly low current consumption. An appreciable energy consumption by the motor only occurs when an assisting or servo power is required.

A special advantage of the present invention lies in the fact that the load state of an electric motor can easily be determined, for example by monitoring the load-dependent, internal electrical resistance of the motor or the likewise load-dependent, electrical voltage drop at the motor. The load state of an electric motor thus constitutes a purely electrical parameter, the monitoring of which can be integrated at little expense in an electrical motor control which is often present in any event. As a result of the invention, an output control of a power steering system or servo control matched to the requirement is made possible at very little expense.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
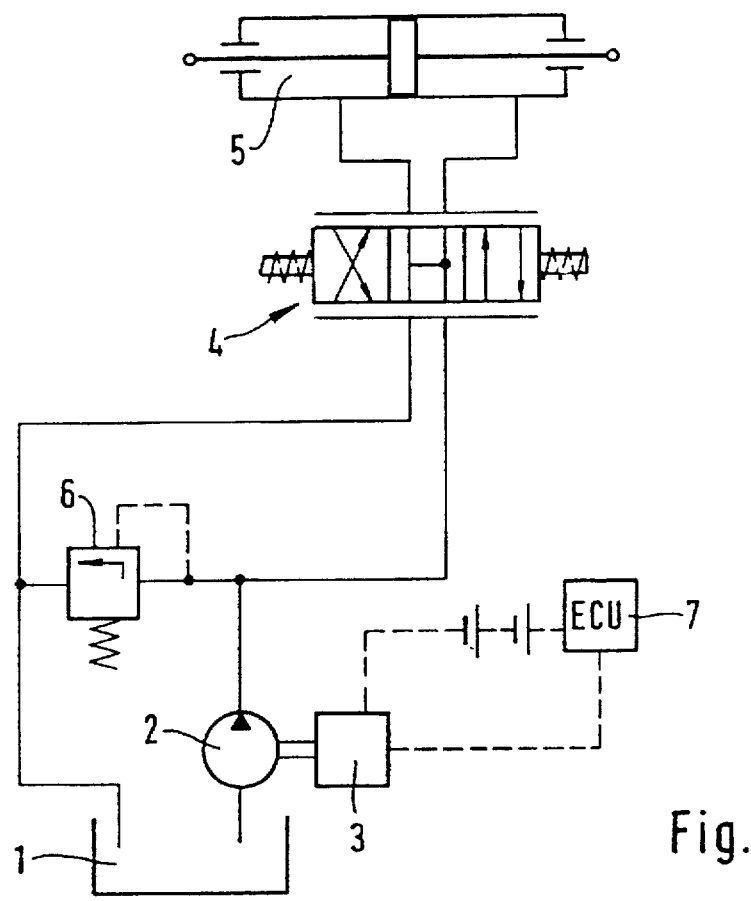
FIG. 1 is a schematic circuit diagram of a power steering system with electrohydraulic support according to the present invention.

Referring now to FIG. 1, a pump 2 is connected on the suction side to a hydraulic reservoir 1 and is driven by an electric motor 3. The pump 2 is also connected on the discharge side to a servo valve designated generally by numeral 4 which is open in its central position. The servo valve 4 is connected, via two motor connections, to a servomotor 5 configured as a dual-action piston-cylinder assembly and, via a further connection, to the hydraulic reservoir 1. The servo valve 4, illustrated schematically as a gate valve, can be adjusted infinitely variably from the illustrated central position in which all the connections are connected directly or indirectly to the reservoir 1, in the direction of two end positions, in which in each case a chamber of the servomotor 5 is connected to the discharge side of the pump 2 and the other side of the servomotor 5 is connected to the hydraulic reservoir 1.

For safety reasons, a pressure relief valve 6 is also arranged on the discharge side of the pump 2 in order to limit the maximum pressure.

An automatic control unit 7 is provided in the current supply to the electric motor 3 and reacts to the load state of the electric motor 3. The electric motor 3 is kept at a very low output by this control unit 7 as long as it is operating against a low resistance, i.e. against a low load. As soon as the loading of the electric motor 3 increases, the output of the electric motor 3 is raised to a large extent with a resultant significant speed increase.

As soon as the electric motor 3 is then again operating against a low load, its output is greatly reduced. This control utilizes the recognition that the throttle resistance against which the pump 2 operates is minimal in the illustrated central position of the servo valve 4 and rises significantly as soon as the servo valve 4 is adjusted out of that central position. Correspondingly, the servomotor 5 has to operate against a resistance predetermined by the position of the servo valve 4 or a load determined by the position of the servo valve 4.

In the example of a power steering system of a motor vehicle, the servo valve 4 is now controlled in a manner which is basically known in dependence on the actuating force to be applied at the steering device such as a steering wheel or handle. The illustrated central position of the servo valve 4 is assumed in the case of negligible or very low actuating forces. In this central position of the servo valve 4, the servomotor 5 cannot generate usable power, irrespective of whether the pump 2 and the electric motor 3 are operating with a high output. On the other hand, in the case of very low or negligible actuating forces at the steering wheel, no assisting power of the servomotor 5 is, of course, required.

In this operating state, therefore, absolutely no requirement for higher outputs by the pump 2 or the electric motor 3 exists. According to the present invention, the electric motor 3, and consequently also the pump 2 operates at an extremely low output. If the actuating forces to be applied at the steering wheel now become greater, however, the servo valve 4 is displaced from the illustrated central position, with the result that the pump 2 operates against a significantly greater throttle resistance and correspondingly the electric motor 3 also has to operate against an increased load. This is "noticed" by the control unit 7. Therefore, the electric motor 3 is switched to high output and correspondingly the pump 2 also operates with a significantly increased output.

Very large pressure differences can thus occur between the motor connections of the servo valve 4, under correspondingly great adjustment thereof, such that the servomotor 5 generates a correspondingly large assisting power.

If now the servo valve 4 returns to its central position again, the throttle resistance against which the pump 2 operates, and correspondingly also the load against which the electric motor 3 has to operate, in turn drop sharply. Consequently, the control unit 7 switches the electric motor 3 back to very low output. According to the present invention, therefore, the pump 2 and its associated driving electric motor 3 are thus operated at a different output, depending on the load requirement.

As previously noted, a special advantage of the present invention resides in the fact that this control inevitably takes place merely by monitoring electrical parameters which change analogously to the loading of the electric motor 3. For example, the internal electrical resistance of the motor 3 or the drop in the electrical voltage occurring at the motor can be monitored. Corresponding parameters can be taken into account by an electrical closed-loop or open-loop motor control, which is often to be provided anyway without relatively great expense.

An advantage of the embodiment illustrated in FIG. 1 also resides in the fact that the hydraulic medium circulates constantly, specifically also in the central position of the servo valve 4, although with very weak flow. If the hydraulic medium should have become viscous in extreme cold, a correspondingly increased load on the electric motor 3 will result. If appropriate, the electric motor 3 will then be switched to increased output by the control unit 7 at a sufficiently high load, so that the hydraulic medium is pumped around very rapidly. As a result, the hydraulic medium is heated up as it is rapidly pumped, even in the central position of the servo valve 4, until sufficient liquidity has been achieved and the load of the electric motor 3 in the central position of the servo valve 4 again assumes very low values. Then, the electric motor 3 is switched to very low output by the control unit 7.

Figure 2:
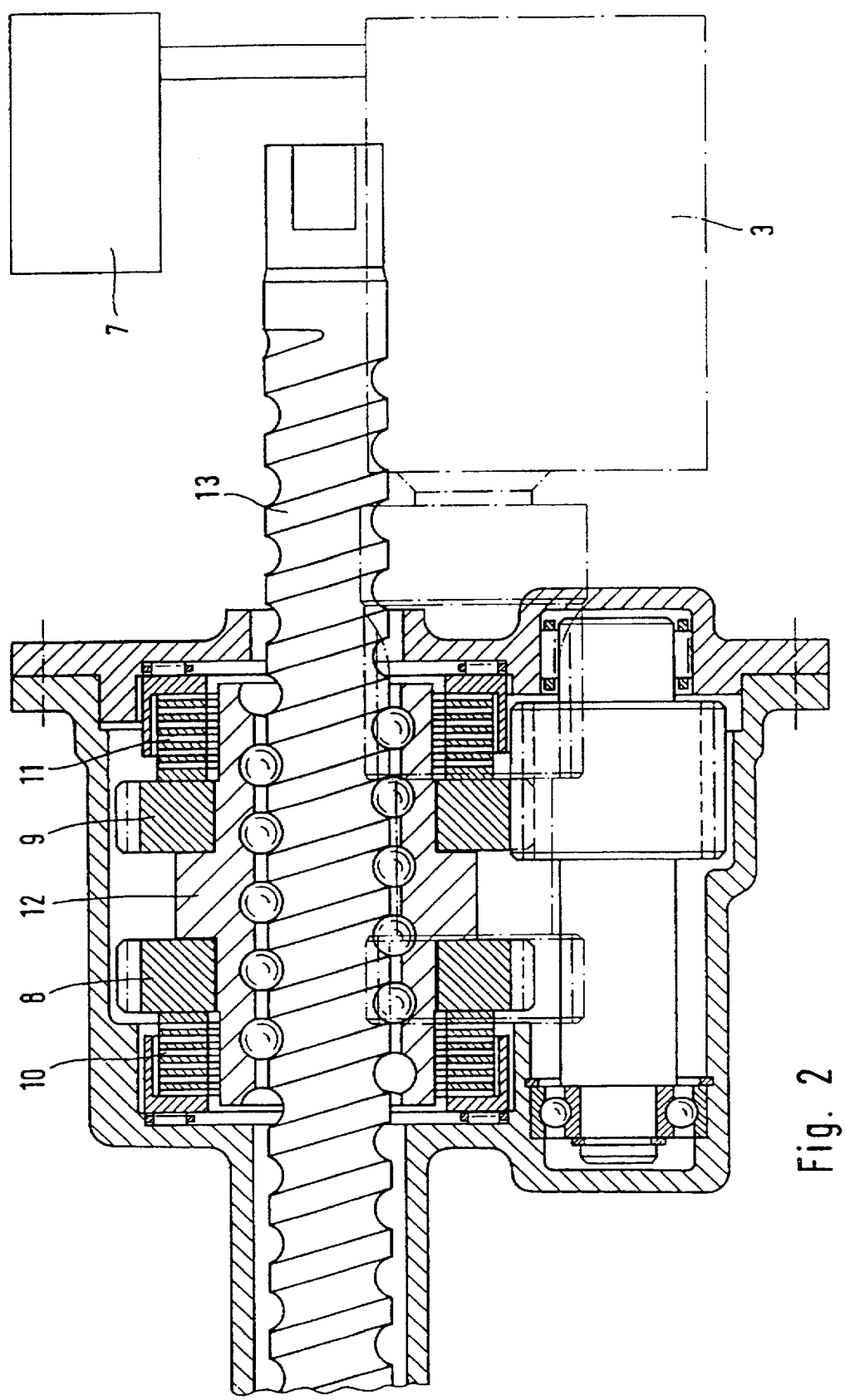
FIG. 2 is a partial cross-sectional view of a power steering system with electromechanical support according to the present invention.

The present invention is not limited to an electrohydraulic power steering system or servo control. As is shown with reference to FIG. 2, for example, the invention can also be implemented in electromechanical systems. The electric motor 3 drives two output gears 8, 9 in a manner which is basically known. The gears rotate in opposite directions and can be coupled via respective friction clutches 10, 11 to a sleeve 12, which, in turn, is drivingly coupled via rotating balls to a spindle 13 in order to displace the latter.

In this embodiment, the friction clutches 10, 11 are controlled by axial relative movements between the parts of the friction clutches 10, 11 assigned to the respective output gears 8, 9, on one hand, and the clutch parts assigned to the sleeve 12, on the other hand. As a result, one clutch 10 or 11 is closed when the sleeve 12 attempts to shift towards the right in FIG. 2, and the other clutch is closed in the case of opposite displacement. In a central position, both clutches 10, 11 are open.

In a motor vehicle steering system, the operating state of the clutches 10, 11 is dependent on the actuating forces to be applied at the steering wheel. Consequently, in the event of relatively large actuating forces, the electric motor 3 attempts to drive the sleeve 12 via one of the output gears 8, 9 and one of the associated clutches 10, 11 in one direction or the other and acts upon the spindle 13 with an assisting power in one or the other direction.

When one of the clutches 10, 11 is closing, the load on the electric motor 3 inevitably has to rise. Thus, the control unit 7 assigned to the electric motor 3 is able to react to the change in load. The output of the electric motor 3 can again be controlled to match the requirement, i.e. with the clutches 10, 11 open, the electric motor 3 runs at a very low output. With the closing of one of the clutches 10, 11 and the rise in the load of the electric motor 3 associated therewith, the electric motor 3 is switched to high output.

Figure 3:
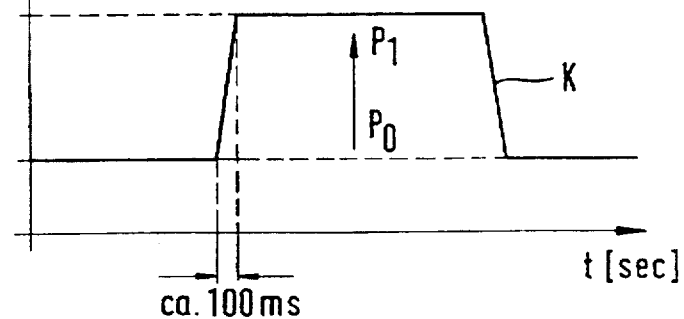
FIG. 3 is a diagram of the output control of the electric motor for the system of FIG. 1.

FIG. 3 illustrates the operating characteristics of the present invention. Both the load L and the speed n of the motor are illustrated as a function of time t. If it is assumed that the load L changes similar to a rectangular curve in the form illustrated, the speed n can also change in a very analogous manner, i.e. essentially the same curve K shows qualitatively the changes of both the load L and the speeds n.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A servo control for use as a power steering system for motor vehicles, comprises one of an electromechanical and electrohydraulic support of setting strokes of a steering device, a constantly running electric motor operatively coupled to a control member by power flux adapted to be controlled by the steering device, wherein the control member is a motor control with electronic load recognition operatively associated with the electric motor so as to maintain the electric motor at a very low output or brings the electric motor to a very low output when the electric motor is operating against a low load, and to bring the electric motor to a high output or maintain the electric motor at a high output when the electric motor is operating against an increased load.

2. The servo control according to claim 1, wherein the electronic load recognition is configured to evaluate internal electrical resistance of the electric motor.

3. The servo control according to claim 1, wherein the electronic load recognition is configured to evaluate the electrical voltage drop at the electric motor.

4. The servo control according to claim 1, wherein the electric motor is operatively arranged to drive a hydraulic pump associated with a servo valve downstream on a discharge side of the hydraulic pump, the servo valve being open in a central position thereof and having a minimum throttle resistance in the central position and a rising throttle resistance when adjusted out of the central position.

5. The servo control according to claim 4, wherein the electronic load recognition is configured to evaluate internal electrical resistance of the electric motor.

6. The servo control according to claim 4, wherein the electronic load recognition is configured to evaluate the electrical voltage drop at the electric motor.

7. The servo control according to claim 1, wherein the electric motor is coupled to a control member of the servo control directly via clutches with a controllable power flux which is dependent on the actuating force of the handle.

8. The servo control according to claim 7, wherein the electronic load recognition is configured to evaluate internal electrical resistance of the electric motor.

9. The servo control according to claim 7, wherein the electric motor is operatively arranged to drive a hydraulic pump associated with a servo valve downstream on a discharge side of the hydraulic pump, the servo valve being open in a central position thereof and having a minimum throttle resistance in the central position and a rising throttle resistance when adjusted out of the central position.

10. The servo control according to claim 7, wherein the electronic load recognition is configured to evaluate the electrical voltage drop at the electric motor.

11. The servo control according to claim 10, wherein the electric motor is operatively arranged to drive a hydraulic pump associated with a servo valve downstream on a discharge side of the hydraulic pump, the servo valve being open in a central position thereof and having a minimum throttle resistance in the central position and a rising throttle resistance when adjusted out of the central position.

* * * * *